(12) United States Patent
Babella

(10) Patent No.: US 8,046,032 B2
(45) Date of Patent: Oct. 25, 2011

(54) PANEL CONSTRUCTION FOR HOUSING KEYPADS OF MOBILE COMPUTING DEVICE

(75) Inventor: Mark Babella, Salida, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 951 days.

(21) Appl. No.: 12/015,495

(22) Filed: Jan. 16, 2008

(65) Prior Publication Data

US 2009/0180246 A1 Jul. 16, 2009

(51) Int. Cl.
*H04M 1/00* (2006.01)
*H04M 9/00* (2006.01)
*G06F 1/16* (2006.01)
*G06F 3/02* (2006.01)
*H05K 5/00* (2006.01)
*H05K 7/00* (2006.01)
*G09G 5/00* (2006.01)

(52) U.S. Cl. ............ 455/575.1; 455/550.1; 361/679.08; 361/679.09; 379/433.01; 379/433.07; 345/169; D14/346

(58) Field of Classification Search ............... 455/550.1, 455/575.1; 361/679.08, 679.09; 379/433.01, 379/433.07; 345/169; D14/346
See application file for complete search history.

(56) References Cited

U.S. PATENT DOCUMENTS

| | | | |
|---|---|---|---|
| 5,612,692 A * | 3/1997 | Dugas et al. | 341/22 |
| 6,488,425 B1 * | 12/2002 | Spence et al. | 400/714 |
| 6,614,905 B1 * | 9/2003 | Kristensen | 379/368 |
| 7,330,216 B2 * | 2/2008 | Purdy et al. | 348/375 |
| 2006/0177047 A1 * | 8/2006 | Grudzinski et al. | 379/433.07 |
| 2006/0188091 A1 * | 8/2006 | Chen | 379/433.01 |
| 2007/0298828 A1 * | 12/2007 | Begic et al. | 455/550.1 |

* cited by examiner

*Primary Examiner* — Dwayne Bost
*Assistant Examiner* — Larry Sternbane

(57) ABSTRACT

A computing device includes a housing, a front housing segment, a keypad assembly and a rigid panel. The front housing segment includes a void. The keypad assembly includes a substrate and a key structure layer. The key structured layer includes a plurality of key structures. The keypad assembly is configured to extend the key structure layer at least partially through the void so as to enable user access to the individual key structures of the key structure layer. A rigid panel is structured to secure to the front housing segment so as to combine with the key structure layer. The panel includes an arrangement of cross-members that define openings, where each opening is dimensioned to fit around at least one key structure of the key structure layer.

12 Claims, 6 Drawing Sheets

PANEL CONSTRUCTION FOR HOUSING KEYPADS OF MOBILE COMPUTING DEVICE

TECHNICAL FIELD

The disclosed embodiments relate to housings for computing devices. In particular, embodiments described herein pertain to a panel construction for housing keypads of mobile computing devices.

BACKGROUND

Over the last several years, the growth of cell phones and messaging devices has increased the need for keypads and button/key sets that are small and tightly spaced. In particular, small form-factor keyboards, including QWERTY layouts, have become smaller and more tightly spaced. With decreasing overall size, there has been greater focus on efforts to provide functionality and input mechanisms more effectively on the housings.

In addition to a keyboard, mobile computing devices and other electronic devices typically incorporate numerous buttons to perform specific functions. These buttons may be dedicated to launching applications, short cuts, or special tasks such as answering or dropping phone calls. The configuration, orientation and positioning of such buttons is often a matter of concern, particularly when devices are smaller.

At the same time, there has been added focus to how displays are presented, particularly with the increase resolution and power made available under improved technology. Moreover, form factor consideration such as slimness and appearance are important in marketing a device.

Many recent mobile computing devices have adopted use of integrated keyboards, such as sheet keys. There are various techniques as to how keyboards are assembled into the housing of a mobile computing device. One technique includes using adhesives to attach a panel layer of the keyboard to the housing.

DETAILED DESCRIPTION

Figure 1:
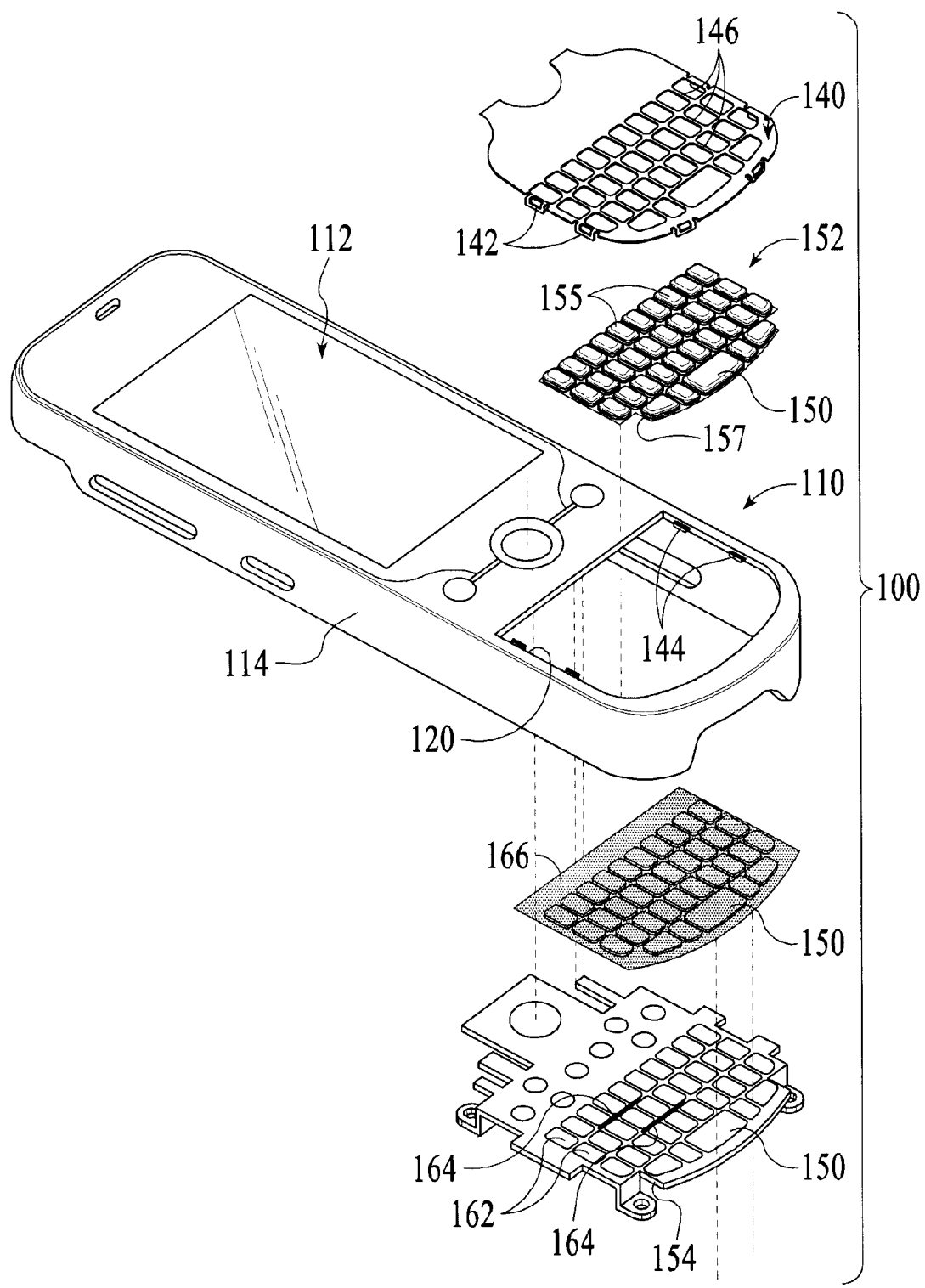
FIG. 1 is an isometric and exploded view of a housing and keypad assembly for a mobile computing device, according to an embodiment.

Embodiments described herein provide for a housing assembly of a computing device that overlays and integrates a keypad unit or assembly using mechanical fasteners. In particular, an embodiment includes a housing panel that can be integrated to provide structure and overlay to a keypad assembly. The housing panel may be coupled or connected with a front housing segment using mechanical fasteners such as snapping features. An embodiment provides that when coupled, the panel includes openings that receive individual key structures of the keypad, so as to surround individual key structures of the keypad with a rigid and continuous thickness.

Among other benefits, embodiments such as described reduce or eliminate the need for adhesives, or adhesive only solutions, to conventional approaches for integrating similar keypads with a panel and/or housing of a mobile computing device. Still further, embodiments enable a durable and rigid panel construction to be assembled with mechanical fasteners onto the keypad so to provide support and structure to the exposed key structures or keycaps. The use of such a construction enables the key structures or keycaps of the keypad assembly to be exposed for access by the user without any intervening thickness or layer. The result is that the individual keycaps or key structures of the keypad have an improved tactile feel.

In an embodiment, a computing device includes a front housing segment, a keypad assembly and a rigid panel. The front housing segment includes a void or other similar opening for receiving a thickness of the keypad assembly. The keypad assembly includes a substrate and a key structure layer having a plurality of key structures. The keypad assembly is configured to extend the key structure layer at least partially through the void so as to enable the user to have access to the individual key structures of the key structure layer. The rigid panel is structured to secure to the front housing segment so as to combine with the key structure layer. The panel includes an arrangement of cross-members that define openings, where each opening is dimensioned to fit around at least one key structure of the key structure layer.

According to an embodiment, each of the panel and the front housing segment include one or more securement features that enable the panel and the front housing segment to secure to one another.

In an embodiment, one of the securement features of one of the front housing segment or the panel includes a tang structure, while the other of the securement features includes a receiving slot for the tang structure. The tang structure may be configured to at least partially extend into one of the receiving structures of the front housing segment.

Still further, an embodiment provides for (i) one or more of the receiving slots of the front housing segment to each include a corresponding structure, and (ii) one or more of the tang structures to include a tip end and an opening. The opening of the tang structure is dimensioned to receive the corresponding structure of the receiving slot when the tip end of the tang structure is inserted into the receiving slot of the front housing segment.

In another embodiment, a panel is provided for use with a keypad of a mobile computing device. The panel includes a plurality of securement features, which may be provided at or near one or more edges of the panel. The securement features may be structured to mate with corresponding structures on a housing segment of the mobile computing device, so as to secure the panel to the front housing segment. The panel may include an arrangement of cross-members that define a plurality of openings. Each opening may be dimensioned to fit around at least one key structure of the keypad when the panel is secured to the front housing segment.

Additionally, an embodiment provides a housing assembly for a mobile computing device. The housing assembly includes a front housing segment and a panel. The front housing segment has at least a first void, and includes a first set of one or more securement features that are provided at or adjacent to the first void. The panel may be rigid and dimensioned to fit within the first void. The panel includes a second set of securement features that can be mated with the first set of securement features that are provided on the front housing segment to retain the panel in the void of the front housing segment. In one embodiment, the panel includes an arrangement of cross-members that define openings, where each opening being dimensioned to fit around at least one key structure of a keypad that is retained within the housing assembly.

The term "tang structure" includes formations such as provided by protrusions or insertive members. In one implementation, a tang structure includes an insertive member that can bias and provide a snap connection.

As used herein, the term "modular" means a pre-assembled or pre-manufactured component. A modular component, for example, means a component that is manufactured and used as one piece in a larger assembly.

Furthermore, the term "substantially flush" means flushness between two surfaces to a degree that appears flush to casual viewing by an observer. For example, two surfaces that are flush within tolerance levels of manufacturing may be said to be "substantially flush".

Housing Assembly Construction

FIG. 1 is an isometric view of a housing and keypad assembly for a mobile computing device, according to an embodiment. A housing assembly 100 includes a front housing segment 110 that forms at least a shell, or a portion of a shell, of an overall housing of the mobile computing device. The front housing segment 110 includes a front façade 112, and perimeter surfaces 114 at lateral and bottom edges of the front housing segment 110. The front housing segment 100 may also include a structure or surface (or alternatively an opening) to accommodate a display surface or area of a display assembly (not shown) that may be contained within the housing assembly 100. The front housing segment 110 may include various openings or voids, including a void 120 that is dimensioned or otherwise configured to receive and accommodate a keypad assembly 150. Once assembled, the keypad assembly 150 may be made available for use on the front façade 112.

In an embodiment, the keypad assembly 150 includes a key structure layer 152 provided over a substrate 154. The key structure layer 152 may define an arrangement of individual key structures 155 that extend from a common carrier 157. The arrangement of key structures 155 may be used to provide a keyboard, a number keypad (such as for enabling telephonic calls) and/or other key inputs. Various configurations and arrangements may be implemented for the keypad, depending on the market and/or other design criteria and influences. In one implementation, the key structure layer 152 is formed from deformable material, such as polyurethane material that is molded or otherwise shaped into the individual keycaps (i.e. key structures 155) and/or carrier 157.

Figure 8:
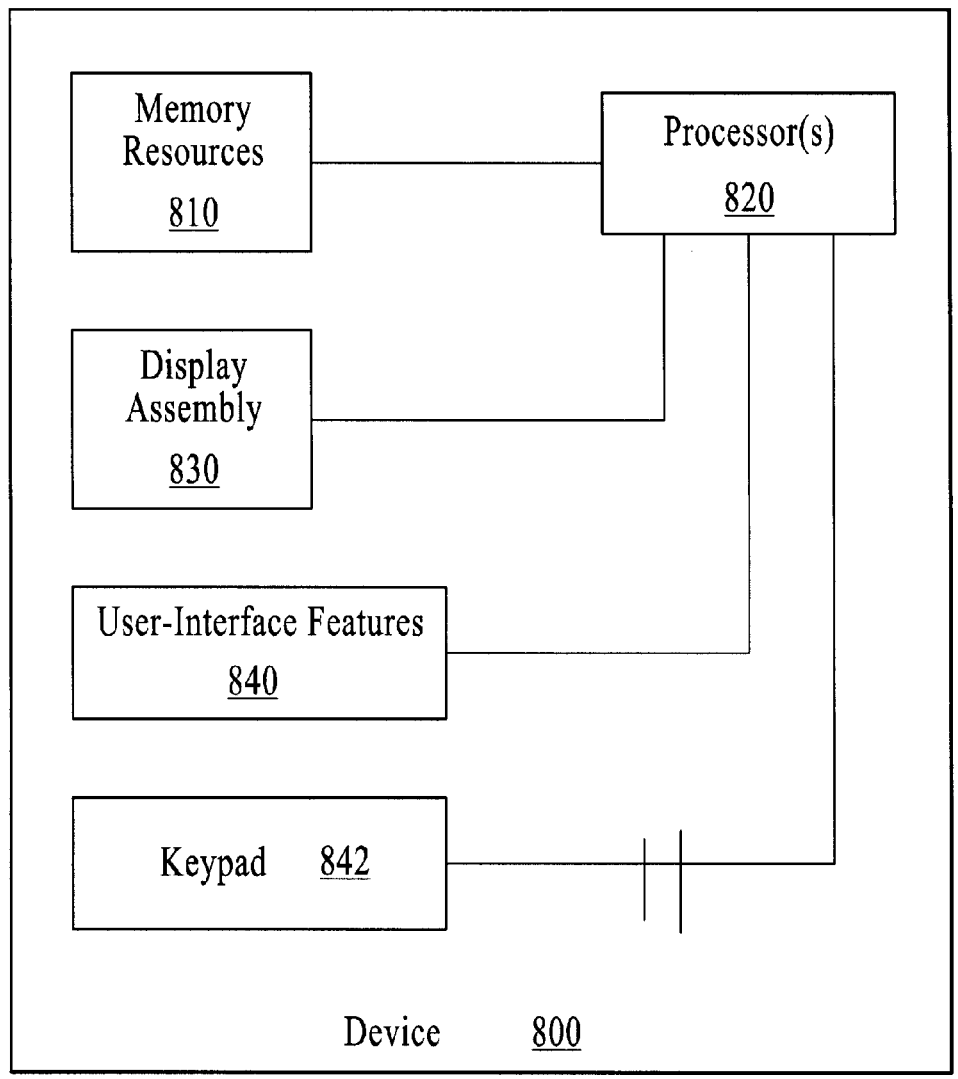
FIG. 8 is a hardware diagram of a device for use with any of the embodiments described herein.

In one implementation, the substrate 154 includes electrical contact elements 162 that are individually aligned with corresponding keycaps or structures, so that insertion of an individual key structure 155 causes the electrical contact element 162 to signal or otherwise actuate. A processor 810 (as shown in FIG. 8) or processing resources of the mobile computing device or keypad may receive and interpret the signal generated from the actuated electrical contact element 162.

In addition to electrical contact elements 162, the substrate 154 may include one or more lighting elements 164 that illuminate some or all of the key structures 155 from underneath. In one implementation, the lighting elements 164 include light emitting diodes (LEDs) or other discrete light sources. In other implementation, the lighting elements 164 may be distributed or planarized, such as provided with an electroluminescent (EL) panel.

Other features that may be provided with the keypad assembly 150 include a deformable layer 166. Among other uses, the deformable layer may enhance structural integrity of the key structures (such as providing shock resistance) while at the same time providing improved tactile feedback.

According to an embodiment, the keypad assembly 150 is a modular component that is manufactured to be a single component. In one implementation, the keypad assembly is a sheet key keyboard unit. In such an implementation, the keypad may be manufactured independently or separately from the remainder of the computing device and/or its housing. For example, the sheet key keyboard may be supplied as a component for assembling a keyboard.

According to an embodiment, the void 120 of the front housing segment 110 is dimensioned to receive at least the key structure layer 152 of the keypad assembly 150. In one embodiment, the keypad assembly 150 may be retained in connection with the front housing segment 110 so that the carrier 157 is provided slightly below (and not flush) with the front façade 112 of the front housing segment 110. The key structure layer 152 may extend slightly above or beyond a height of the front façade 112.

According to an embodiment, the housing assembly 100 includes a rigid panel 140 that is shaped and dimensioned to fit within the void 120. The panel 140 may include one or more securement features 142 that mate with corresponding securement features 144 provided on the front housing segment 110. In an embodiment, the securement features 142, 144 may provide one or more combinations of male/female or other mated pair connections. In an embodiment shown, the corresponding securement features 144 of the front housing segment 110 may include apertures and/or structural elements. Examples include insertive members (and paired apertures), snap couplings and/or biased tongs or other structures that can expand and contract when mated or inserted in receiving structures.

The panel 140 may include openings 146 that receive individual key structures 155 of the key structure layer 152. The panel 140 may thus provide a structural element for the keypad assembly 150. As a structural element, the panel 140 may facilitate durability, aesthetics and/or usability of the device or housing as a whole. Still further, among other benefits, the use of securement features 142, 144 enables a snap or pressure fit assembly of the panel 140, keypad assembly 150 and front housing segment 120. Among other benefits, the panel 140 mechanically secures to the front housing segment 110, providing a durable housing element that may be both decorative and functional.

While an embodiment of FIG. 1 illustrates the securement features 142 of panel 140 being insertive and inserting into securement features 144 of the front housing segment 110, an embodiment may alternatively reverse the locations of the types of securement features. In such reversal, the front housing segment 110 includes the insertive securement features, while the panel 140 includes openings for receiving the insertive securement features. Still further, an embodiment such as described below provides for use of interlocking securement features. The interlocking securement features provide each connection point of the panel 140 and front housing segment 110 with both an opening and an insertive element, so that securement at that connection point results in an interlocked or mated pair of insertive features.

Figure 2:
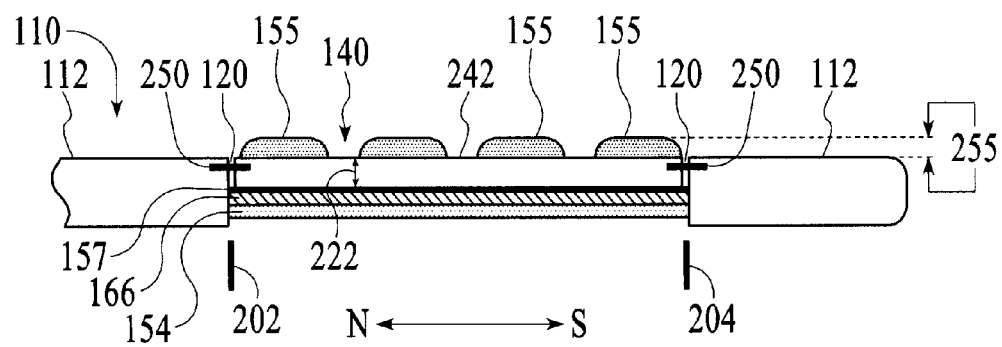
FIG. 2 is an illustrative cross-sectional view of a panel assembled over a key structure layer such as described with an embodiment of FIG. 1, according to an embodiment.

FIG. 2 is an illustrative cross-sectional view of the panel 140 assembled over the key structure layer 152, according to an embodiment. While an embodiment of FIG. 2 is shown as an illustrative cross-section of elements of FIG. 1 (when assembled), the illustrated cross-section may be used with other embodiments as well. As shown, the panel 140 is assembled over the void 120 of the front housing segment 110 and includes a thickness 222 that is dimensioned to be substantially flush with the surrounding region of the front housing segment 110. In particular, a top surface 242 of the panel 140 is substantially flush or aligned with the front façade 112 at both the top end 202 and bottom end 204 (alternatively viewed as north and south directions) of the panel 140. Similar flush assembly may be provided in other directions (i.e. east west). The panel 140 may sit over the carrier 157 of the keypad assembly 150, and include the openings 146 (FIG. 1) that are positioned and dimensioned to fit around the individual key structures 155 of the key structure layer 152. The individual key structures 155 may extend through the corresponding openings 146 from carrier 157. The key structures 155 may be extended a height 255 that is slightly above the panel 140 and the front façade 112.

As represented by an embodiment of FIG. 2, securement features 250 may be extended between the front housing segment 110 and the panel 140 in order to retain the panel in position over the void 120. As described with an embodiment of FIG. 1, one embodiment provides for the securements 250 to include tang structures (such as shown and described with elements 450 of FIG. 4) that extend into corresponding receiving structures (such as openings described with element 320 of FIG. 3) of the front housing segment 110. The securement features 250 may be distributed in different positions on the void 120 and front housing segment 110. For example, pairs of securement features 250 may be provided on north and south ends of the panel 140, and one or more securement features may be provided on each lateral side of the panel 140. More or fewer securement features may be used, in different arrangements, and not necessarily on each side.

Figure 3:
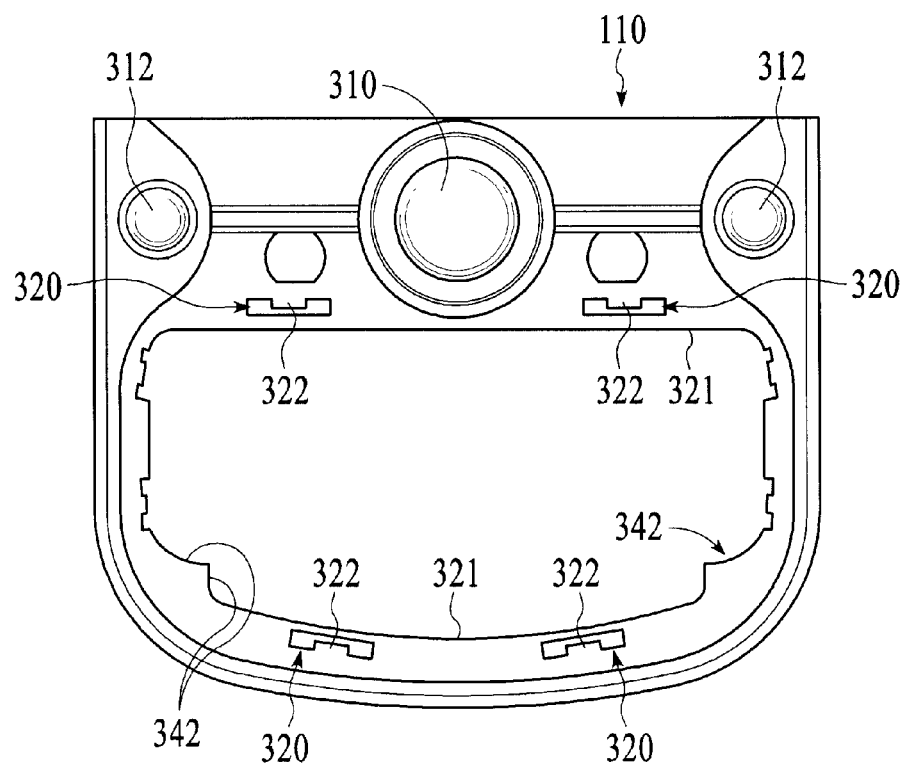
FIG. 3 is a frontal partial view of a front housing segment, configured in accordance with an embodiment of the invention.

FIG. 3 is a frontal partial view of the front housing segment 110, under an embodiment of the invention. The void 120 (FIG. 1) includes contours 342 that shape it to match the key structure layer 152 of the keypad assembly 150 (FIG. 1). In one implementation, input mechanisms such as a navigation mechanism 310, buttons or contact surfaces 312, and other input features may be provided at a region 312 of the front façade 112 above the void 120.

Figure 4:
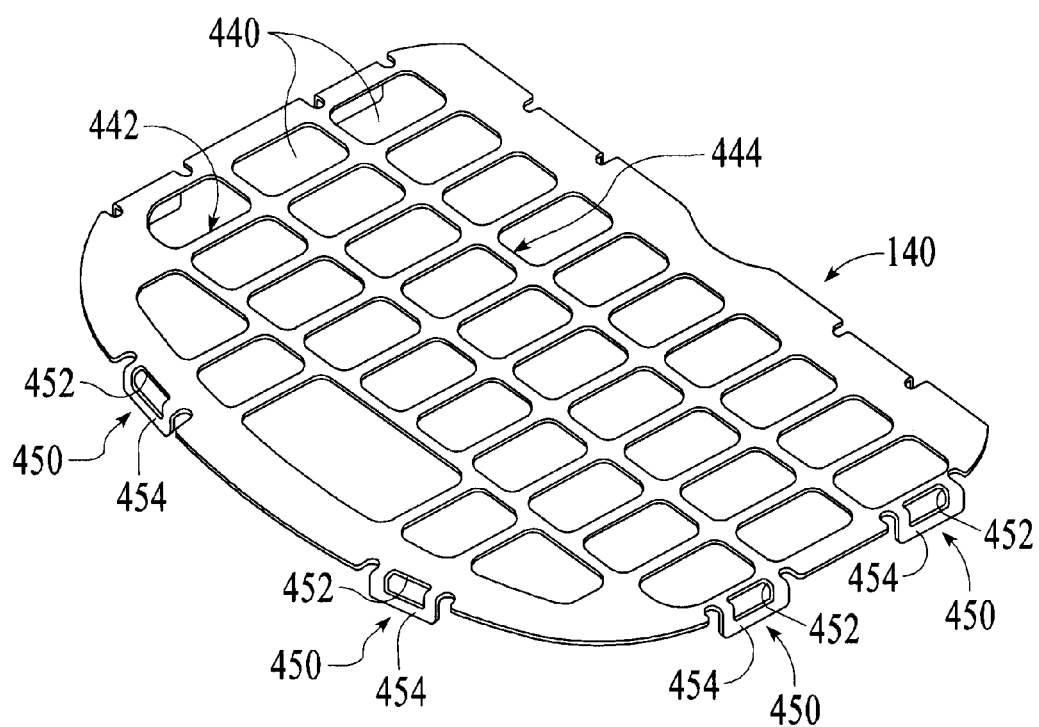
FIG. 4 is a front isometric view of a panel for use in housing a keypad, where the panel is shown isolated from a remainder of the housing assembly, according to an embodiment.

In an embodiment, the front housing segment 110 includes a set of securement features for receiving corresponding mating structures of the panel 140. In an embodiment, the securement features correspond to receiving structures, including receiving slots 320 or apertures, that are dimensioned and shaped to receive tang structures 450 (see FIG. 4). As shown by an embodiment of FIG. 3, receiving structures of the front housing segment 110 include receiving slots 320 that are provided at or near edges 321 of the void 120. In an embodiment shown by FIG. 3, the receiving structures each include the receiving slot and a corresponding structure 322 that extends inward (or along the direction of insert) and which is capable of flexing with bias to receive the inserted member. The inserted member may correspond to a tang structure or other insertive structure that is provided with the panel 140. In one embodiment, when the tang structure 450 (FIG. 4) of the panel 140 is inserted into the receiving slot 320, the corresponding structure 322 biases to accommodate the tang structure 450 (FIG. 4). As illustrated with an embodiment of FIG. 4 and FIG. 5, the tang structure 450 (FIG. 4) itself may be paired with its own receiving slot that enables the structure 322 to at least partially relax and move back towards its original position. At the original position, the structure 322 may be held by the receiving slot of the tang structure 450 (FIG. 4).

FIG. 4 is a front isometric view of the panel 140, isolated from a remainder of the housing assembly, according to an embodiment. The panel 140 may be rigid and unitary or single-pieced. The panel 140 may be dimensioned and shaped to fit or otherwise be accommodated within the void 120 of the front housing segment 110 (see FIG. 3).

In an embodiment, the panel 140 is shaped to include a plurality of key structure openings 440. The key structure openings 440 may be defined by one or more cross-members 442, 444 which are positioned to define the openings 440. The key structure openings 440 are shaped to receive individual key structures 155 (FIG. 1) of the key structure layer 152.

The panel 140 includes a set of securement features provided at or near peripheral edges 444. In an embodiment, the securement features are in the form of tang structures 450, which include insertive protrusions that snap into shaped receiving slots 320 of the front housing segment 110. In one implementation, the tang structures 450 bias slightly to reduce one of its dimensions. When engaged with a corresponding receiving slot 320 (see FIG. 3) or aperture of the front housing segment 110 (see FIG. 3), the individual tang structure 450 (or its tip end) biases inward to reduce dimension, so as to fit through the receiving slot 320. Once inserted through the receiving slot, an implementation provides that the tang structure 450 may relax, so as to facilitate securement of the front housing segment 110.

As mentioned with an embodiment of FIG. 3, the tang structures 450 may include corresponding openings 452 that are positioned to receive the structures 322 (FIG. 3) of the corresponding receiving slots 320 (FIG. 3) in the front housing segment 110 (FIG. 3). More specifically, the tang structures 450 may be provided as clips or protrusions that extend as levered or biased arms from the panel 140. Accordingly, each tang structure 450 may also include a tip end 454 that is extended into the receiving slots 320 (FIG. 3). Additionally, in one implementation, the openings 452 may be formed using formations of the tangs 450 and panel 140, including indentations in the peripheral area of the panel 140 where the tang structure 450 is provided, as well as spacing between the shape of the tang structure 450 and the panel 140. In one implementation, the opening 452 of each tang structure 450 is three-dimensional. With insertion of the tip ends 454 of each of the tang structures 450, the structures 322 of the corresponding receiving slots 320 (FIG. 3) the front housing segment 110 may also be moved outward with bias, so as to flex. When tip end 454 of each individual tang structure 450 is sufficiently inserted so that the tang structure's opening 452 is aligned with the structure 322 of the corresponding receiving slot 320 (FIG. 3) on the front housing segment 110 (FIG. 3), the structure 322 (FIG. 3) of the front housing segment 110 may snap into the tang structure's opening 452, thus capturing the tip end 454 of the tang structure 452 in position.

Figure 5A:
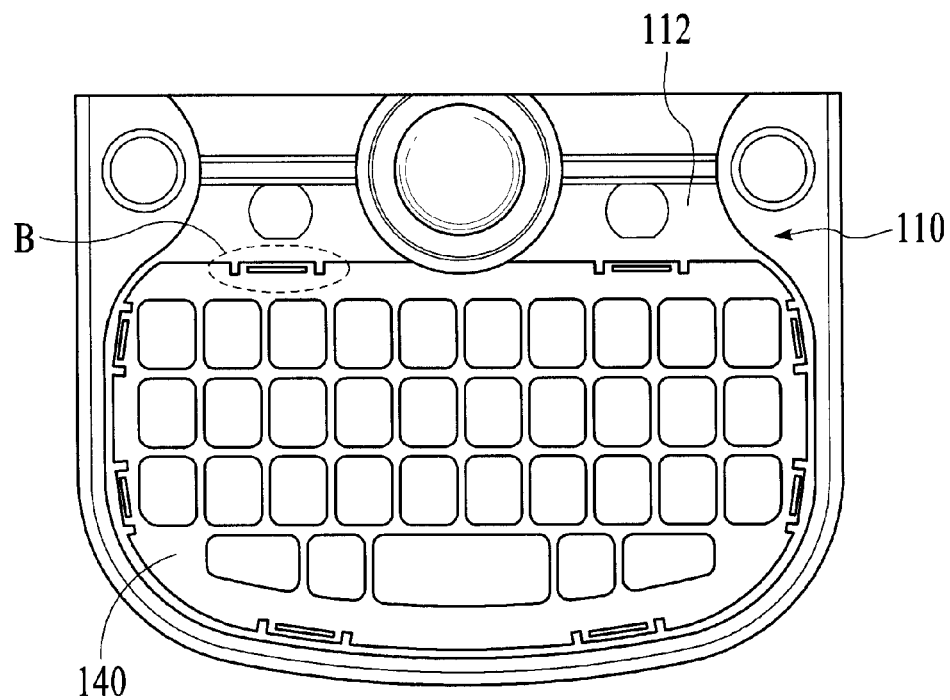
FIG. 5A is a front view illustrating a panel coupled or otherwise assembled onto a front housing segment of a mobile computing device, according to an embodiment.

FIG. 5A is a front view illustrating the panel 140 coupled or otherwise assembled onto the front housing segment 110, according to an embodiment. The panel 140 may be dimensioned to fit into the void 120 of the front housing segment 110, so that the panel is substantially flush and relatively smooth plate that is visually integrated with the front façade 112 of the front housing segment 110.

Figure 5B:
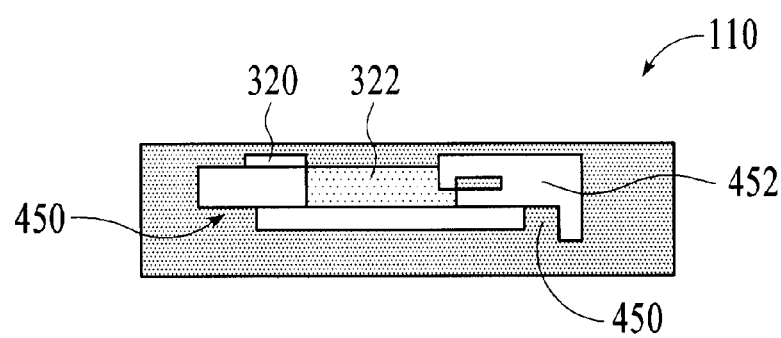
FIG. 5B is a close-up of a mechanical connection provided by securement features shown by a circle B of an embodiment of FIG. 5A.

FIG. 5B is a close-up of one of the connections amongst securement features shown with an embodiment of FIG. 5A, as shown by circle B of FIG. 5A, according to an embodiment. When panel 140 is mated with the front housing segment 110, the tang structures 450 and their respective tip ends 454 are inserted into the receiving slots 320 of each of the front housing segments 110. When inserted, the structures 322 of the front housing segment's receiving slots 320 snap into the openings 452 (see FIG. 4) of the tang structures 450. Once the tip ends 454 are inserted, the structures 322 of the receiving slots 320 are pushed aside until those structures are aligned with the openings 452 (FIG. 4) of the tang structures 450. At this point, each structure 322 is released at least partially so as to be retained by the tang opening 452 (FIG. 4). Likewise, the tip ends 454 (FIG. 4) of the tang structures 450 are biased then captured in the corresponding receiving slots 320 of the front housing segment 110. From the top view of FIG. 5B, the lip for opening 452 of the tang structure is adjacent structure 322 of receiving slots 320. The result is an interlocking securement, in which (i) the tip end 454 of the tang structures 450 is biased to remain in the corresponding receiving slot 320 of the front housing segment 110, and (ii) the structure 322 of each receiving slot 320 is engaged and biased to remain in the tang structure's opening 454 (shown in FIG. 4).

Among other benefits, securement features such as described enable an efficient and cost-effective process to assembly the panel 140 and front housing segment 110. In particular, an assembly process may be used in which the panel 140 is securely and potentially permanently snap-fitted with the front housing segment 110. The result is that panel 140 rigid and durable, and may be combined with the key structure assembly 150 (see FIG. 1), without use of adhesives or layers that are otherwise prone to separation after prolonged use by the user.

Figure 6:
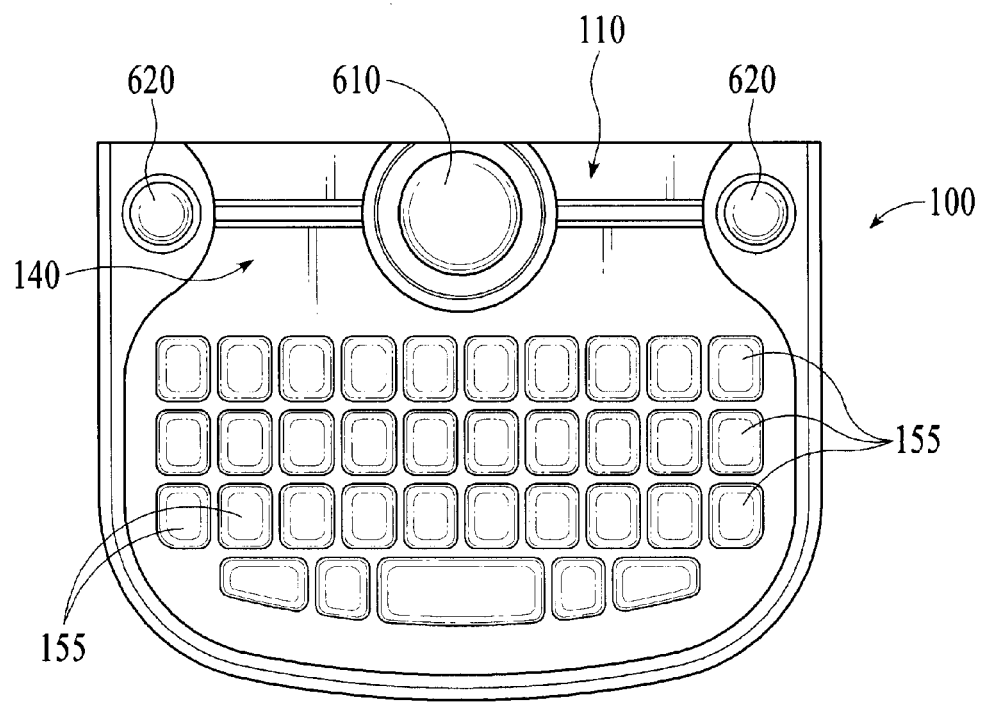
FIG. 6 illustrates a fully-assembled computing device housing with keypad assembly, according to an embodiment.

FIG. 6 illustrates a fully-assembled computing device housing with keypad assembly, according to an embodiment. As described above, the computing device housing assembly 100 includes the panel 140 snap-fitted or otherwise coupled with the front housing segment 110. The resulting coupling may be achieved with relative tight tolerances, so that panel 140 is substantially flush with the front housing segment 110. Furthermore, the resulting combination may minimize seams between the two elements. Key structures 155 of the assembly may be extended outward from the panel 140 to provide, for example, a miniaturized keyboard. Other buttons, such as a navigation feature 610 and one or more action or application or action buttons 620 may be provided above the keypad area of the housing.

As shown by an embodiment of FIG. 6, the individual key structures 155 are exposed so as to enable direct user-contact. In one implementation, the key structures are provided as, for example, polyurethane formations. Some past approaches have relied on additional layers of PET film over the key structures to facilitate adhesion and securement of the key structure assembly as a whole. In contrast to such past approaches, no such exterior film is required by embodiments such as shown. Rather, the key structures 155 (which may be provided as polyurethane thicknesses) are exposed to the user for direct contact, thus enhancing the tactile feel of the keypad as a whole. As described with an embodiment of FIG. 7, for example, the PET film may be used with the panel 140 (FIG. 1), separate from the keypad assembly.

According to an embodiment, an assembly process for the housing and/or computing device may include forming the front housing segment, then inserting the keypad assembly (which may be a modular unit), and finally assembling the panel 140. By enabling the panel 140 to be inserted after the keypad assembly, an embodiment enables determination of the keypad design to be postponed in the overall manufacturing process. This enables production to be tailored for specific markets based on inventory supply and demand. In particular, specific markets often demand alternative language keyboard designs, such as QWERTY, QWERTZ, AZERTY, Arabic or other keyboard designs. Numerous layouts for other languages and keyboard conventions may also be used. By postponing the determination of the keyboard design, the devices as a whole may be assembled to better meet market demands.

Panel Material

Figure 7:
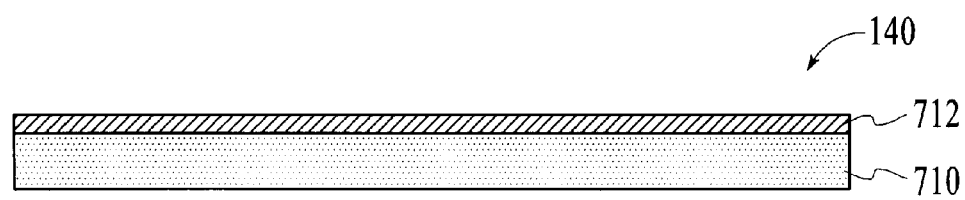
FIG. 7 illustrates a cross-section of a panel for use with any of the embodiments described herein, under an embodiment.

FIG. 7 illustrates is a side-view of a panel for use with any of the embodiments described herein, under an embodiment. The panel 710 may be designed to be rigid and durable, for prolonged use and reliably assembly with the front housing segment 110 (FIG. 1). In one embodiment, the panel 710 is formed from rigid material, which may correspond to a metal (such as tin or aluminum or alloy), plastic, or a composite. As described with one or more previous embodiments, the panel 710 may be shaped to include one or more cross-members 442, 444 (see FIG. 4) which are positioned to define the openings 440 (FIG. 4) that receive the individual key structures 155.

According to an embodiment, the panel 140 may also include an exterior layer 712 which serves to provide visual appearance and/or integration with the remainder of the housing. In one embodiment, the exterior layer 712 is in the form of Polyethylene Terephthalate (PET) film, including MYLAR or similar coatings. In one implementation, PET film 712 of the panel 140 may be formed during a separate manufacturing process, where the coating is permanently affixed to the metal or rigid material 710. The panel 140 may then be separately formed by a manufacturing process, independent of a subsequent assembly process by which the housing and/or computing device are formed. In one embodiment, the PET film 712 is translucent, and provides gloss or aesthetic coating, as well as other functional properties. The PET film 712 may be shaped to expose the openings 146. For example, the PET film 712 may have openings punched through it. A similar film or layer may be extended over the front housing segment 110, so that the entire front housing segment 110 is substantially seamless and flush (including the display surface).

Among other benefits, by forming the panel 140 separately to include the PET film 712, the assembly process can readily avoid extending the PET film over the individual keycaps of the underlying keypad. Rather, the keypad may extend its keycaps through the panel 140 without an intervening layer, such as may otherwise be provided from the PET film 712.

Hardware Diagram

FIG. 8 is a hardware diagram of a device for use with any of the embodiments described herein. A device 800 may correspond to any of the devices illustrated with preceding embodiments. The device 800 may include memory resources 810, one or more processors 820, a display assembly 830, and various user-interface features 840. In one embodiment, at least some of the user-interface features 840 include a keyboard or keypad 842 that is provided through a panel construction of the housing.

According to an embodiment, the display assembly 830 is provided its own housing segment. In an embodiment in which a PET layer is extended over the display area of the computing device, the one or more processors 820 may employ sensors that are capable of generating or detecting input from touch or contact. Such use of sensors enables soft-interface features to provided with, for example, a flush panel display and/or front façade 112 (see FIG. 1). Soft-user interface features may be provided as computer-generated features in connection with operation of the display assembly 830, or alternatively, as fixed features. As mentioned with prior embodiments and/or soft-user interface features may operate with touch, contact or light sensors (e.g. capacitive sensors).

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. This, the absence of describing combinations should not preclude the inventor from claiming rights to such combinations.

The invention claimed is:

1. A computing device comprising:
a housing including a front housing segment having a void;
a keypad assembly including a substrate and plurality of key structures, the plurality of key structures being aligned with the void so as to enable user access to the individual key structures; and
a rigid panel including an arrangement of openings, each opening being dimensioned to fit around at least one of the plurality of key structures;
a first securement feature provided on one of the front housing segment or the rigid panel and comprising an integrated combination of a tang structure and an opening;
a second securement feature provided on the other of the front housing segment or the rigid panel comprising (i) a receiving slot to receive the tang structure, and (ii) a structure integrated with the receiving slot that inserts into the opening of the first securement feature;
wherein the first and second securement features secure the panel and the front housing segment together so that the plurality of key structures are securely provided through the arrangement of openings of the panel.

2. The computing device of claim 1, wherein the one or more securement features of one of the front housing segment or the panel include a tang structure and a corresponding receiving slot that combine to snap or pressure fit together so as to secure the panel to the front housing segment.

3. The computing device of claim 1, wherein the rigid panel includes a metal sheet.

4. The computing device of claim 3, wherein the rigid panel includes a Polyethylene Terephthalate (PET) film formed over the metal sheet.

5. The computing device of claim 1, wherein each of the panel and the front housing segment include one or more securement structures to enable the panel to secure to the front housing segment;
wherein the panel and the front housing segment are structured so that the panel is substantially flush with a façade of the front housing segment when the panel is secured to the front housing segment.

6. The computing device of claim 1, wherein the keypad assembly includes a plurality of electrical elements that are provided with the substrate, the plurality of electrical elements including a corresponding electrical element for each of the plurality of key structures in the key structure layer.

7. The computing device of claim 1, wherein the keypad assembly includes one or more lighting elements provided on or with the substrate to illuminate the key structure layer from underneath.

8. The computing device of claim 1, further comprising a deformable layer provided between the key structure and the substrate.

9. A housing assembly for a mobile computing device, the housing assembly comprising:
a front housing segment having at least a first void, wherein the front housing segment includes a first set of securement features that are provided at or adjacent to the first void; and
a rigid panel that is dimensioned to fit within the first void, the panel including a second set of securement features that are mated with the first set of securement features to retain the panel in the void of the front housing segment;
wherein the panel includes an arrangement of cross-members that define openings, each opening being dimensioned to fit around at least one key structure of a keypad that is retained within the housing assembly; and
wherein the first set of securement features include one or more receiving slots, and wherein the second set of securement features include one or more tang structures that are each received within one of the one or more receiving slots to secure the panel to the front housing segment; and
wherein the first set of securement features include one or more structures that are combined with each of the receiving slots and which each extend into corresponding openings of the tang structures when the individual tang structures extend into the corresponding receiving slot.

10. The housing assembly of claim 9, wherein the rigid panel is formed at least in part by a metal sheet.

11. The housing assembly of claim 10, wherein the rigid panel includes a Polyethylene Terephthalate (PET) film formed over the metal sheet.

12. A computing device comprising:
a housing including a front housing segment, the front housing segment including a void;
a keypad assembly including a substrate and a key structure layer, the key structure layer including a plurality of key structures, the keypad assembly being configured to extend the key structure layer at least partially through the void so as to enable user access to the individual key structures of the key structure layer; and
a rigid panel that is structured to secure to the front housing segment so as to combine with the key structure layer, the panel including an arrangement of cross-members that define openings, each opening being dimensioned to fit around at least one key structure of the key structure layer;
wherein each of the panel and the front housing segment include one or more securement features that enable the panel and the front housing segment to secure to one another, the one or more securement features of one of the front housing segment or the panel including a tang structure, the one or more securement features of the other of the front housing segment or the panel includes a receiving slot for the tang structure;

wherein each of the one or more tang structures are configured to at least partially extend into one of the corresponding receiving structures, and wherein one or more of the receiving slots each include a corresponding structure, and wherein one or more of the tang structures include a tip end and an opening, the opening of the tang structure being dimensioned to receive the corresponding structure of the receiving slot when the tip end of the tang structure is inserted into the receiving slot.

* * * * *